United States Patent Office 2,807,578
Patented Sept. 24, 1957

2,807,578

METHOD FOR IMPROVING MOIST TITANIUM HYDROLYZATE BY ELECTRICAL MEANS

Foord von Bichowsky, Wilmington, Del.

No Drawing. Application July 11, 1956,
Serial No. 597,078

5 Claims. (Cl. 204—130)

The present invention relates to a method for improving the moist titanium hydrolyzate produced during the manufacture of titanium pigment via the sulfate method and more particularly to a process for the removal from such hydrolyzates of residual sulfuric acid and/or sulfate through the employment of electrical means.

It is known that during the manufacture of titanium pigments by the hydrolysis of solutions containing titanium sulfate there is obtained, as a hydrolyzate, a hydrated titanium oxide which after filtering, washing, etc., still contains about 5 to 10% of sulfuric acid either combined with or occluded in the metatitanic acid of the filter cake of hydrolyzate. During the later step of calcining this cake sulfuric acid fumes or decomposition products are evolved which constitute such a nuisance that in modern plants considerable capital is tied up in equipment for capturing and disposing of those fumes. Because of this and for other reasons various means have been proposed for the improvement of the cake through the removal or neutralization of such contained sulfuric acid prior to the calcination. These proposals are of a chemical nature and cover neutralizing the sulfuric acid or converting it, for example, into barium sulfate through the use of barium carbonate or hydrate.

This art is well known and is discussed at length in such reference works as: J. Berksdale: Titanium, Ronald Press Co., N. Y. (1949), pages 205–6. Gmelins Handbuch der anorg. Chemie, 8. Auflage, System Nr. 4, Titan. Verlag Chemie G. m. b. H, Weinhorn/Bergstrasse (1951), page 107.

Such chemical methods, however, are accompanied with certain drawbacks of which a few now will be mentioned. For example, the use of neutralizing agents such as ammonia produces some gel-like orthotitanic acid in the pigment which tends to lower its quality. Also the employment of such agents can introduce slight amounts of other chemicals into the pigment or fix certain impurities therein and this adversely effects the tint and/or other properties of the finished product. The addition of the barium compound, as mentioned above, serves to dilute the pigment with an inert extender and thus to lower its covering power.

With the aim of eliminating these and other drawbacks I recently undertook a study of the effect of an electric current upon such commercial titanium hydrolyzates and as a result of that work its action has been discovered to vary unexpectedly with the type of current employed. With an alternating current of even moderate potential the filter cake material, between the electrodes, compacts and a layer of clear acidic liquid covers that area. However, with a direct current, likewise at moderate potential, a reduction of the supposedly insoluble basic titanium sulfate content takes place while at a considerably lower potential only the much more readily ionized sulfuric acid is acted upon. In the case of a current composed of a low potential direct current component upon which is superimposed an alternating current of higher potential, the electrolysis of the sulfuric acid content is expedited.

The putting into practice of these discoveries will be illustrated by examples.

*Example 1.*—1 kilogram of $TiO_2$ in the form of matatitanic acid precipitated by hydrolysis and filtered and then containing about 45%, by weight, of solids of which about 5% is free or combined sulfuric acid, is placed in a glass vessel fitted with two sheet lead electrodes having an effective surface of about 9 sq. in. each and spaced about 2 inches apart. An alternating current of 60 cycles frequency and of the sine curve type is passed between them at a potential of 12 volts. At the end of an hour the filter cake paste between the Pb plates settles noticeably. The clear acid solution on top is removed, the cake reslurried and the treatment repeated several times. In this way the free acid content of the cake is reduced by about one half.

*Example 2.*—In this example the same kind and amount of filter cake is used as in the preceding case only it is placed in one compartment of a two compartmented cell in which the compartments are separated by a porous diaphragm. Into the second compartment there is poured an equivalent volume of pure water faintly acidified with sulfuric acid so that its pH is about 6. The same two cleaned lead electrodes are used. The one serving as the anode is in the water compartment, the other is immersed in the pasty filter cake. A potential of 2 volts of direct current is passed between the plates. At the end of an hour the pH in the water compartment is found to be at around pH 4.

*Example 3.*—In this example the same set-up and the same amounts of reactants are used as in the preceding run. Here, however, a potential of 6 volts of alternating current is superimposed on a direct current potential of 2 volts, the current density during most of the run is held at 0.11 amp./sq. in. At the end of 3 hours the pH in the anode compartment falls to less than 2 while that in the slurry rises to about 3. The anolyte at the end of that period is very dilute sulfuric acid. The catholyte paste now is stirred thoroughly and the electrolysis continued. After four other interruptions and stirring, or after 15 hours in all, the electrolysis is stopped. The desulfated cake now is subjected to the usual calcination procedure during which no evolution of sulfurous fumes is observable. The resultant pigment is of a superior tint and also is more readily convertible to rutile.

In the preceding part of the specification the use of an alternating current of the sine curve type of 60 cycles/second is referred to but this invention is not to be considered as restricted to that frequency nor shape of cycle.

It will be understood that while I have disclosed the preferred embodiments of my invention the same may be varied within the spirit of the invention and the scope of the appended claims.

I claim:

1. Method for improving moist titanium hydrolyzate through the lowering of its sulfatic acid content which comprises the step of subjecting the moist commercial hydrolyzate of metatitanic acid to the action of an electric current between lead electrodes under substantially non-reducing conditions as concerns the titanium compounds and separating the desulfated metatitanic acid therefrom.

2. Method for improving moist titanium hydrolyzate through the lowering of its sulfatic acid content which comprises the step of subjecting the moist commercial hydrolyzate of metatitanic acid to the action of an electric current between lead electrodes specifically an alternating current and separating the desulfated metatitanic acid.

3. Method for improving moist titanium hydrolyzate through the lowering of its sulfatic acid content which comprises the step of subjecting the moist commercial hydrolyzate of metatitanic acid to the action of an electric current between lead electrodes specifically a direct current under substantially non-reducing conditions as concerns the titanium compounds and separating the desulfated metatitanic acid therefrom.

4. Method for improving moist titanium hydrolyzate through the lowering of its sulfatic acid content which comprises the step of subjecting the moist commercial hydrolyzate of metatitanic acid to the action of an electric current between lead electrodes specifically a direct current together with a superimposed alternating current under substantially non-reducing conditions as concerns the titanium compounds and separating the desulfated metatitanic acid therefrom.

5. Method for improving moist titanium hydrolyzate through the lowering of its sulfatic acid content which comprises the step of subjecting the moist commercial hydrolyzate of metatitanic acid, contained in the porous cathode compartment of a two compartmented electrolytic cell of which the other compartment contains acidulated water, to the action, under substantially non-reducing conditions as concerns the titanium compounds, of an electric current between lead electrodes which is composed of a low potential direct current plus a superimposed alternating current of higher potential for such a period that substantially all of the sulfate ions in the hydrolyzate are transferred to the anode compartment and separating the desulfated metatitanic acid from the porous compartment.

References Cited in the file of this patent

UNITED STATES PATENTS

| | | |
|---|---|---|
| 1,216,371 | Schwerin | Feb. 20, 1917 |
| 2,533,208 | Allan et al. | Dec. 12, 1950 |
| 2,688,572 | Warshaw | Sept. 7, 1954 |